(12) United States Patent
Mueller et al.

(10) Patent No.: US 7,898,463 B1
(45) Date of Patent: Mar. 1, 2011

(54) RUNWAY IDENTIFICATION SYSTEM VIA RADAR RECEIVER

(75) Inventors: Clint A. Mueller, Cedar Rapids, IA (US); Golam M. Bokhtier, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 657 days.

(21) Appl. No.: 11/838,135

(22) Filed: Aug. 13, 2007

(51) Int. Cl.
*G01S 13/04* (2006.01)
*G01S 13/93* (2006.01)
*G01S 13/95* (2006.01)
*G01S 13/00* (2006.01)

(52) U.S. Cl. ...... 342/33; 342/26 R; 342/26 B; 342/26 D; 342/27; 342/175; 342/195; 340/945; 340/947; 701/1; 701/3; 701/300; 701/301

(58) Field of Classification Search ............... 342/5–11, 342/26 R–26 D, 29–60, 82, 89, 165, 173–175, 342/195, 27, 28, 350, 385, 386, 407, 410, 342/411, 412, 176, 179; 701/300, 301, 1, 701/3, 14–18; 324/600, 649, 658, 663, 664, 324/667; 702/1–5; 340/500, 540, 541, 552–557, 340/945–957, 971–983

See application file for complete search history.

(56) References Cited

U.S. PATENT DOCUMENTS

| | | | |
|---|---|---|---|
| 3,878,506 A * | 4/1975 | Young | 340/953 |
| 3,882,381 A * | 5/1975 | Gregory | 324/667 |
| 3,939,474 A | 2/1976 | Coleman et al. | |
| 3,971,025 A * | 7/1976 | Levine | 340/952 |
| 4,042,822 A | 8/1977 | Brandewie et al. | |
| 4,088,996 A | 5/1978 | Hooker, Jr. | |
| 4,092,644 A | 5/1978 | Hodge | |
| 4,101,893 A * | 7/1978 | Lewis | 342/411 |
| 4,103,300 A * | 7/1978 | Gendreu et al. | 342/33 |
| 4,137,530 A | 1/1979 | Hooker, Jr. | |
| 4,219,818 A | 8/1980 | Mansur, Jr. | |
| 4,283,725 A * | 8/1981 | Chisholm | 342/26 B |
| 4,418,349 A * | 11/1983 | Hofgen et al. | 342/37 |
| 4,568,938 A | 2/1986 | Ubriaco | |
| 4,717,917 A | 1/1988 | Alitz | |
| 4,814,729 A | 3/1989 | Becker | |
| 4,884,077 A | 11/1989 | Landt | |
| 4,952,941 A | 8/1990 | Landt | |
| 5,047,775 A | 9/1991 | Alitz | |
| 5,049,886 A | 9/1991 | Seitz et al. | |
| 5,053,773 A | 10/1991 | Mosinski | |
| 5,132,689 A | 7/1992 | Van Wyk | |
| 5,198,828 A | 3/1993 | West et al. | |
| 5,268,698 A * | 12/1993 | Smith et al. | 340/552 |
| 5,323,223 A | 6/1994 | Hayes | |
| 5,459,468 A * | 10/1995 | Hartal | 342/7 |
| 5,481,268 A | 1/1996 | Higgins | |
| 5,483,240 A | 1/1996 | Hsu et al. | |
| 5,517,197 A | 5/1996 | Algeo et al. | |
| 6,185,486 B1 * | 2/2001 | Labounsky et al. | 701/15 |
| 6,201,494 B1 | 3/2001 | Kronfeld | |
| 6,208,284 B1 | 3/2001 | Woodell et al. | |

(Continued)

*Primary Examiner* — Bernarr E Gregory
(74) *Attorney, Agent, or Firm* — Matthew J. Evans; Daniel M. Barbieri (57) ABSTRACT

A runway identification system including a weather radar system. The weather radar system includes a receiver. The receiver is configured to receive a runway characteristic signal from a transponder associated with a runway. The runway identification system determines a runway identification based on the runway characteristic signal.

22 Claims, 10 Drawing Sheets

U.S. PATENT DOCUMENTS

| | | |
|---|---|---|
| 6,282,487 B1 * | 8/2001 | Shiomi et al. ............... 340/951 |
| 6,388,607 B1 | 5/2002 | Woodell |
| 6,424,288 B1 | 7/2002 | Woodell |
| 6,441,773 B1 | 8/2002 | Kelly et al. |
| 6,448,922 B1 | 9/2002 | Kelly |
| 6,462,697 B1 * | 10/2002 | Klamer et al. ............... 342/36 |
| 6,512,476 B1 | 1/2003 | Woodell |
| 6,549,161 B1 | 4/2003 | Woodell |
| 6,603,425 B1 | 8/2003 | Woodell |
| 6,606,035 B2 * | 8/2003 | Kapadia et al. ............... 340/972 |
| 6,650,275 B1 | 11/2003 | Kelly et al. |
| 6,741,203 B1 | 5/2004 | Woodell |
| 6,741,208 B1 | 5/2004 | West et al. |
| 6,744,408 B1 | 6/2004 | Stockmaster |
| 6,950,037 B1 * | 9/2005 | Clavier et al. ............... 340/945 |
| 7,109,912 B1 | 9/2006 | Paramore et al. |
| 7,109,913 B1 | 9/2006 | Paramore et al. |
| 7,129,885 B1 | 10/2006 | Woodell et al. |
| 7,158,072 B1 | 1/2007 | Venkatachalam et al. |
| 7,242,343 B1 | 7/2007 | Woodell |
| 7,579,978 B1 * | 8/2009 | Finley ............... 342/33 |
| 7,587,278 B2 * | 9/2009 | Poe et al. ............... 701/301 |

* cited by examiner

RUNWAY IDENTIFICATION SYSTEM VIA RADAR RECEIVER

BACKGROUND

The present disclosure relates generally to the field of aviation. Specifically, the present disclosure relates to a system and method for runway identification via a radar receiver.

Airplanes sometimes land short, land long, enter the wrong runway, enter an active runway, and/or enter a runway with hazardous conditions. A runway has certain characteristics that are unique to a particular runway. These characteristics may be runway length, width, starting position, ending position and runway-end-warning distance. An airplane may enter a runway short because the airplane landed before the runway-starting position. An airplane may enter a runway long because the airplane landed too far from the runway-starting position. An airplane may enter the wrong runway because of a miscommunication between the aircrew and the tower.

A runway identification system may be used to improve situational awareness which may reduce pilot workload to allow the aircrews to avoid mistakes, such as landing short, landing long, entering an active runway, entering the wrong runway, and/or entering a runway with hazardous conditions. A system that is configured to provide runway identification details, which could be utilized to provide warning signals based on the airplane potentially landing short, landing long, entering the wrong runway, entering an active runway, and/or entering a runway with hazardous conditions would be advantageous. The system is configured to provide warning signals, which could reduce the likelihood of any of these situations from occurring.

What is needed is a runway identification system configured to provide sufficient runway identification details to allow the aircrew to more effectively determine the appropriate course of action in an aircraft landing situation.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the disclosure relates to a runway identification system. The runway identification system includes a weather radar system. The weather radar system includes a receiver. The receiver is configured to receive a runway characteristic signal from a transponder associated with a runway. The runway identification system is configured to determine a runway identification utilizing the runway characteristic signal.

Another embodiment of the disclosure relates to a method for runway identification utilizing a runway transponder located in proximity to the runway. The method includes receiving a runway characteristic signal from the runway transponder and determining a runway from the runway characteristic signal. The method further includes transmitting a runway identification signal and determining at least one of an advisory state, a caution state, and a warning state based on the runway characteristic signal. The method also includes storing the runway characteristic signal in a database.

Another embodiment of the disclosure relates to a runway identification system. The runway identification system includes a means for providing weather radar and a means for receiving a runway characteristic signal from a transponder associated with a runway. The runway identification system further includes a means for determining a runway identification utilizing the runway characteristic signal and a means for transmitting at least one of an advisory signal, a caution signal, and a warning signal based on the runway characteristic signal.

Another embodiment of the disclosure relates to a runway identification system for an airport including a first runway, a second runway, a first runway transponder, a second runway transponder, and a communication network. The communication network is in communication with first runway transponder and second runway transponder. The first runway transponder being configured to transmit a first runway characteristic signal corresponding to the first runway and a second runway transponder being configured to transmit a second runway characteristic signal corresponding to the second runway.

BRIEF DESCRIPTION OF THE DRAWINGS

The disclosure will become more fully understood from the following detailed description, taken in conjunction with the accompanying drawings.

DETAILED DESCRIPTION OF THE EXEMPLARY EMBODIMENTS

Although the description below contains many specificities, these specificities are utilized to illustrate some of the exemplary embodiments of this disclosure and should not be construed as limiting the scope of the disclosure. The scope of this disclosure should be determined by the claims, their legal equivalents and the fact that it fully encompasses other embodiments which may become apparent to those skilled in the art. A method or device does not have to address each and every problem to be encompassed by the present disclosure. All structural, chemical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

Figure 1:
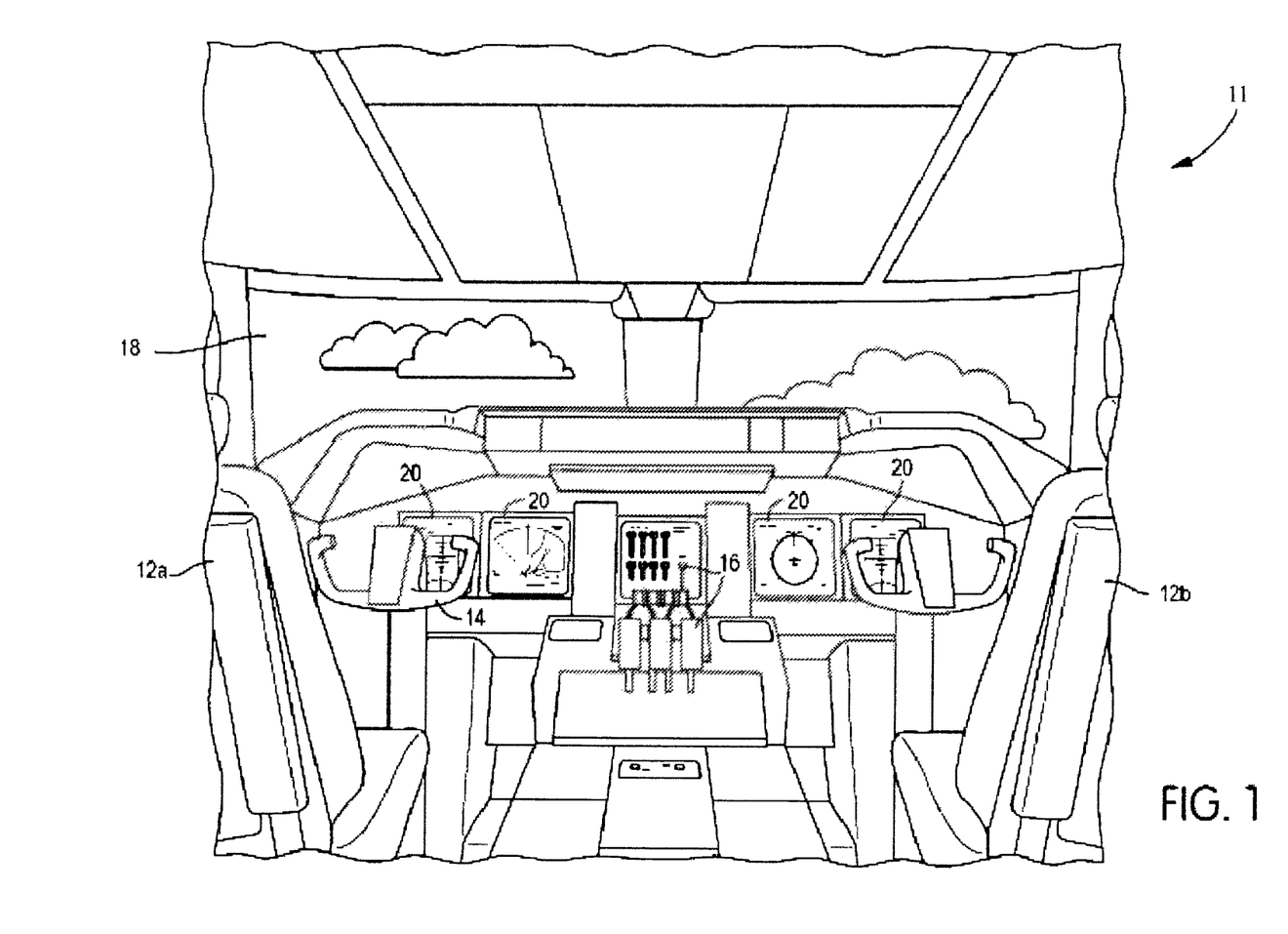
FIG. 1 is an illustration of an aircraft control center, according to one exemplary embodiment.

Referring to FIG. 1, an illustration of a cockpit or an aircraft control center 11 is shown, according to one exemplary embodiment. Aircraft control center 11 may include a pilot seat 12a, a co-pilot seat 12b, an aircraft control stick or yoke 14, a plurality of flight controls 16 and a number of flight displays 20. The pilot sitting in pilot seat 12a may utilize aircraft control stick 14 as well as other flight controls to maneuver an airplane 10. The pilot may initiate airplane 10 maneuvers including moving airplane 10 in an upwardly motion, downwardly motion, banking to the left, banking to the right or any combination thereof. The pilot can visually monitor the flight path thorough windshield 18. However, when the pilot utilizes windshield 18, his visual range is limited.

The crew utilizes flight displays 20 to increase their visual range and to enhance their decision-making abilities. In an exemplary embodiment, flight displays 20 may be configured to show weather, terrain, fixed obstacles, variable obstacles (i.e., other airplanes), flight characteristics (i.e., altitude or speed), or any combination thereof.

Figure 2A:
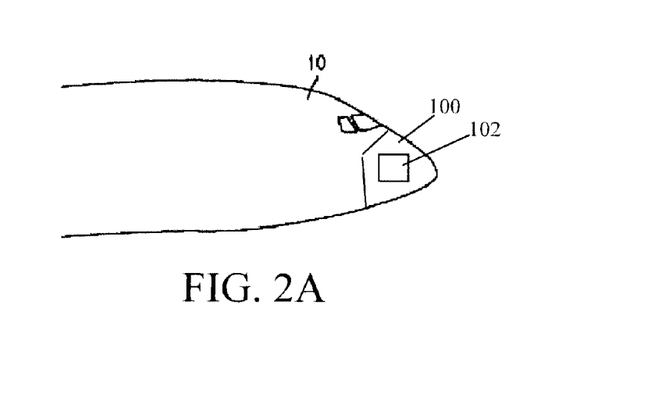
FIG. 2A is an illustration of an aircraft cone section, which includes the radar receiver, according to one exemplary embodiment.

Referring to FIG. 2A, an illustration of an aircraft cone section 100 is shown. Airplane 10 includes aircraft cone section 100. In an exemplary embodiment, aircraft cone section 100 may include equipment that is utilized to identify a runway. For example, the equipment may include the weather radar platform and can employ radio frequency ("RF") technology. In an exemplary embodiment, aircraft cone section 100 includes a weather radar 102. Weather radar 102 is configured to be able to receive signals from ground stations and transceivers/transponders placed on the runway. Weather radar 102 is configured to include all the functionality of a WRT-2100 model. The WRT-2100 may be purchased from Rockwell Collins, Cedar Rapids, Iowa 52498. In an exemplary embodiment, aircraft cone section 100 may also include equipment associated with a TAWS, GPWS, GCAS, WRT or any combination thereof.

Figure 2B:
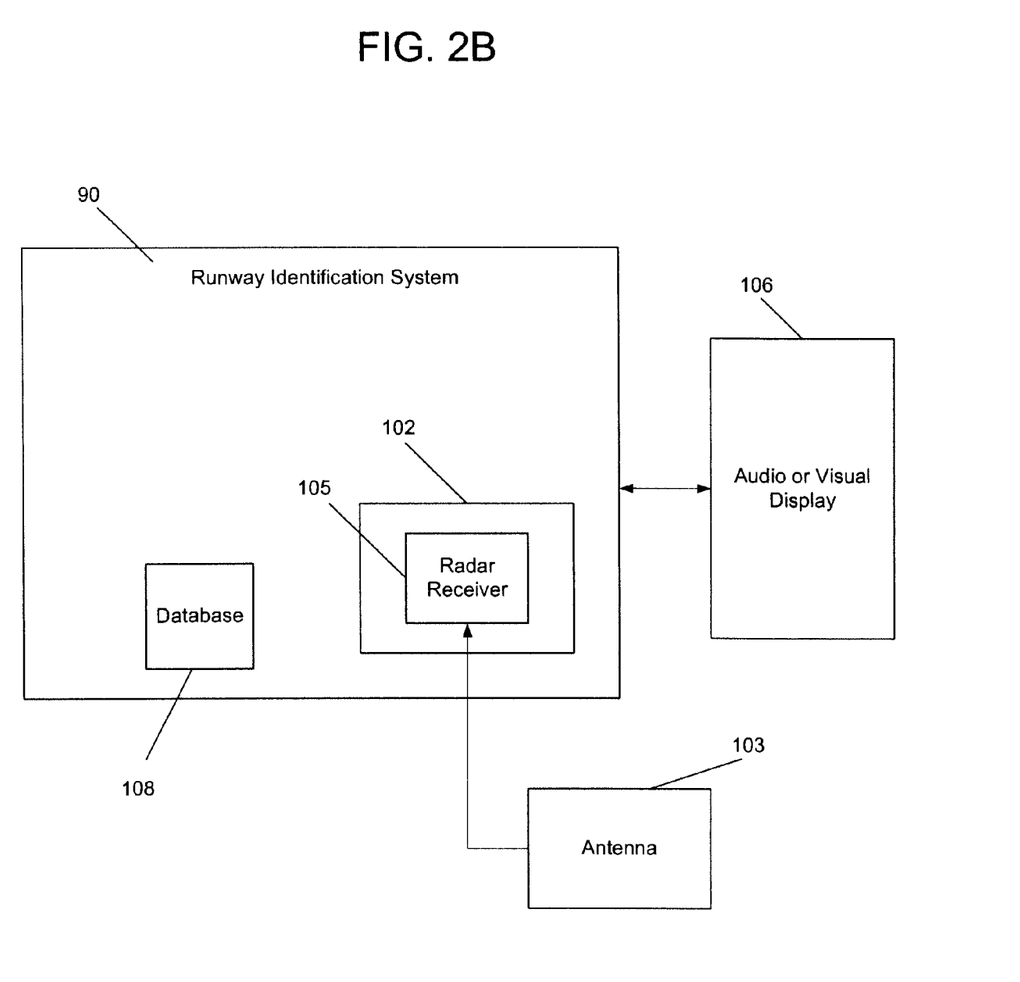
FIG. 2B is a block diagram of the runway identification system shown in FIG. 2A, according to an exemplary embodiment.

Referring to FIG. 2B, a block diagram of a runway identification system 90 is shown, according to an exemplary embodiment. In an exemplary embodiment, runway identification system 90 includes weather radar 102 and a database 108. Weather radar 102 has a radar receiver 105, which is in communication with an antenna 103. In an exemplary embodiment, runway identification system 90 is in communication with a display 106. In an exemplary embodiment, display 106 can be an audio display, a visual display or both.

In an exemplary embodiment, runway identification system 90 may be utilized in combination with a Terrain Awareness and Warning System ("TAWS") to communicate with aircrew that the aircraft's flight path may be on an imminent collision course with an obstacle. TAWS may include a Ground Proximity Warning System (GPWS), a Ground Collision Avoidance Systems (GCAS), a Terrain Awareness and Warning System or any combination thereof.

In an exemplary embodiment, runway identification system 90 is based on the ability of weather radar 102 to identify and detect different frequency signals. In an exemplary embodiment, each runway 200 (see FIG. 3) in an airport may have transceiver/transponder 214 (see FIGS. 4A-4C). Transponder 214 transmits a particular frequency or channel for each runway 200. In an exemplary embodiment, an airport with 32 runways may be configured to have 32 transmitting channels each transmitting different unique frequencies. The table below is an exemplary embodiment of runway frequencies.

| Runway ID No./Transmitting Channel | Transmitting Frequency (Hz) |
|---|---|
| 1 | 9,000,000,000 |
| 2 | 9,000,000,001 |
| 3 | 9,000,000,002 |
| 4 | 9,000,000,003 |
| 5 | 9,000,000,004 |
| 6 | 9,000,000,005 |
| 7 | 9,000,000,006 |
| 8 | 9,000,000,007 |
| 9 | 9,000,000,008 |
| ... | ... |
| ... | ... |
| ... | ... |
| 31 | 9,000,003,000 |
| 32 | 9,000,003,100 |

In an exemplary embodiment, radar receivers 105 are able to detect each individual frequency and determine the specific runway associated with that particular frequency. In another exemplary embodiment, weather radar 102 may be configured to radiate a passive transponder with a transmission and determine the specific runway associated with that particular passive transponder.

Figure 3:
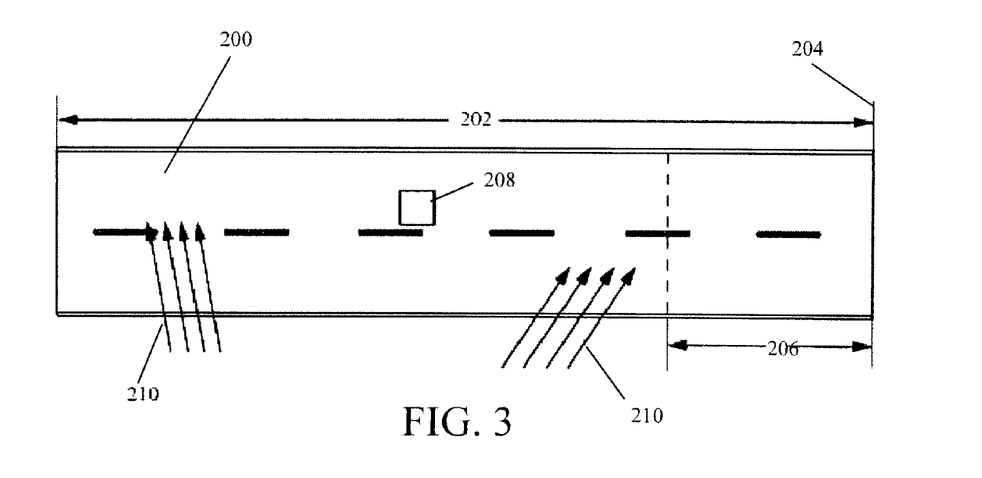
FIG. 3 is an illustration of a runway, according to an exemplary embodiment.

In FIG. 3, an illustration of a runway 200 is shown, according to an exemplary embodiment. Runway 200 includes a runway length 202 and a runway end 204. In an exemplary embodiment, runway identification system 90 can be configured to utilize a runway-end-warning distance 206 to signal to the flight crew that runway end 204 is approaching. In another exemplary embodiment, runway identification system 90 can be configured to utilize runway length 202, runway end 204 and/or runway-end-warning distance 206 to initiate an advisory signal, a caution signal or a warning signal. In an exemplary embodiment, runway identification system 90 can be configured to identify and prioritize the level of notification. An advisory signal is the lowest level of notification and indicates that the aircraft crew should be aware of the condition. A caution signal is the second highest level of notification and indicates that the aircraft crew should be aware of the condition at a higher level than an advisory signal. A warning signal is the highest level of notification and indicates that the aircraft crew should be aware of the conditions and take affirmative action to avoid the condition.

In another exemplary embodiment, runway identification system 90 can be configured to utilize runway data including information regarding an obstacle 208 and characteristic information related to wind 210. In an exemplary embodiment, obstacle 208 may be debris, material handling equipment, other aircraft, emergency vehicles or personnel. In an exemplary embodiment, obstacle 208 may be tagged with a radio frequency transceiver that allows the system to be actively aware of the position of obstacle 208. In an exemplary embodiment, an emergency vehicle may enter runway 200 while airplane 10 is five hundred miles from runway 200. In this situation, runway identification system 90 can be configured to initiate an advisory signal. If the emergency vehicle exits runway 200, the advisory signal is discontinued. In an exemplary embodiment, the emergency vehicle remains on runway 200 when airplane 10 is one hundred miles from runway 200. In this situation, runway identification system 90 can be configured to initiate a caution signal. If the emergency vehicle exits runway 200, the caution signal is discontinued. In an exemplary embodiment, the emergency vehicle remains on runway 200 when airplane 10 is twenty-five miles from runway 200. In this situation, runway identification system 90 can be configured to initiate a warning signal. In another exemplary embodiment, runway identification system 90 can be configured to alert obstacle 208 that airplane 10 is approaching. In an exemplary embodiment, the alert could include airplane characteristics (i.e., size, weigh, speed, or fuel level) and/or data concerning arrival time. In an exemplary embodiment, the system could also be a passive system. It should be noted that the advisory, caution and warning signals could be initiated at any distance desired.

In an exemplary embodiment, wind 210 characteristics may be transmitted to the aircraft crew. Wind 210 characteristics may include speed, strength, direction, and/or cross currents. In an exemplary embodiment, runway identification system 90 can be configured to receive other weather information, such as rain, snow or hail.

Figure 4A:
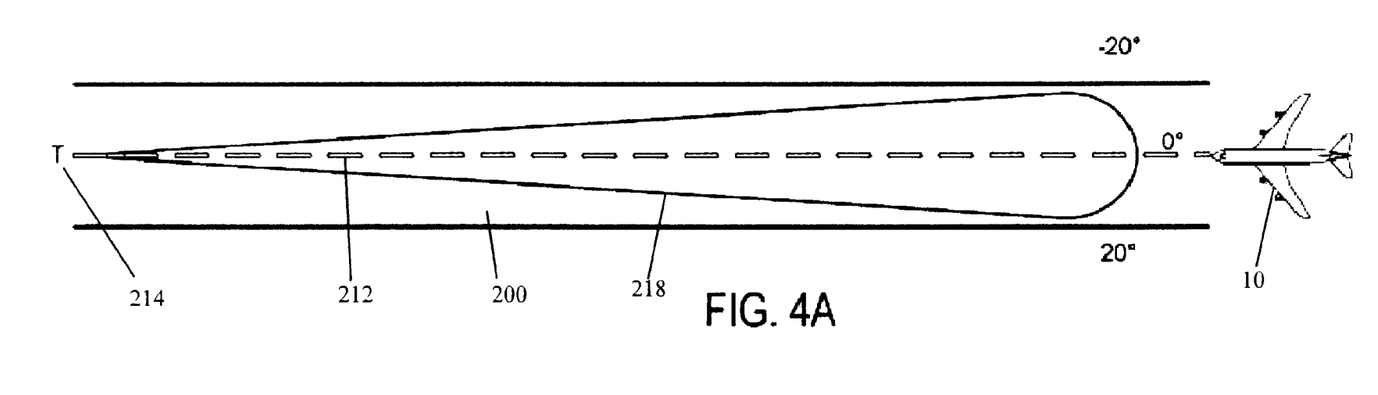
FIGS. 4A-4C are illustrations of runway system configurations, according to exemplary embodiments.
Figure 4B:
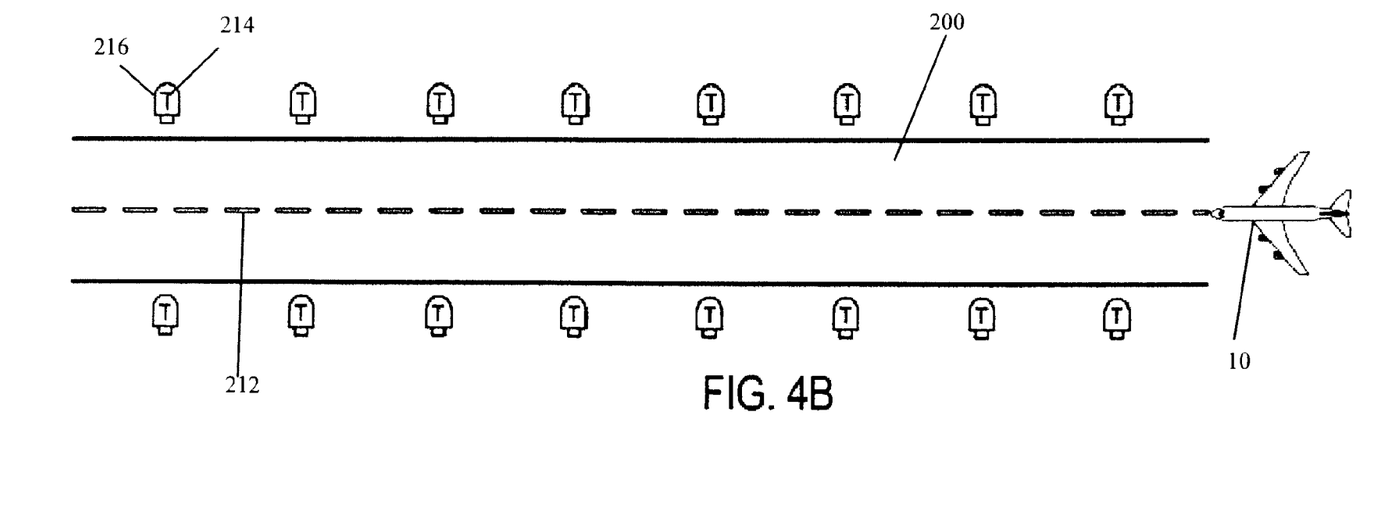
Figure 4C:
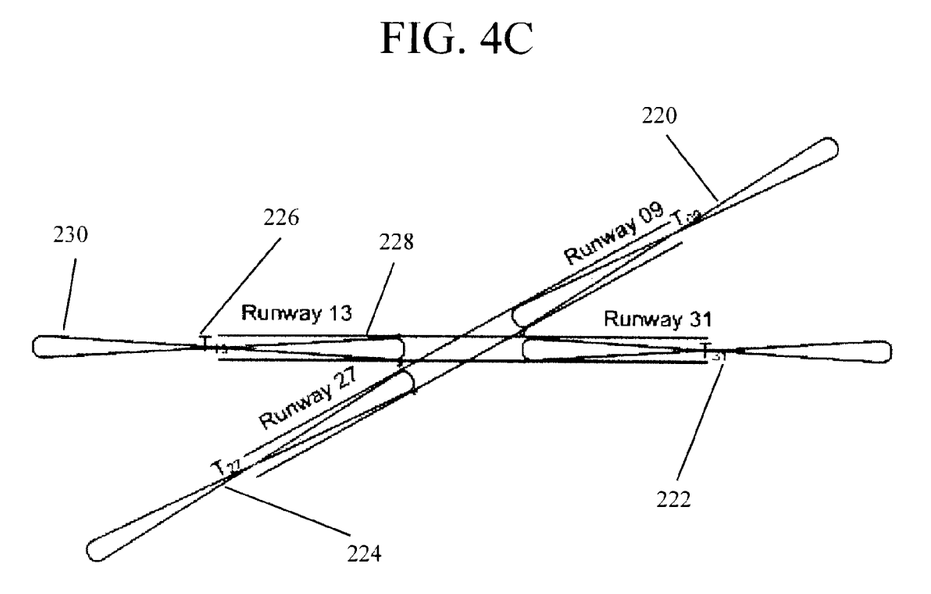

In FIGS. 4A-4C, illustrations of runway system configurations are shown, according to exemplary embodiments. In FIG. 4A, airplane 10 is approaching runway 200. In an exemplary embodiment, a transponder 214 is located at a runway centerline 212 on runway 200. Transponder 214 has a signal envelope 218. In an exemplary embodiment, signal envelope 218 maintains a −20° to +20° coverage region around runway centerline 212. In this exemplary embodiment, runway centerline 212 has an angle of 0°. Signal envelope 218 is configured to minimize overflow and/or interference between signal envelope 218 on runway 200 and signal envelope (not shown) on a different runway (not shown). In an exemplary embodiment, transponder 214 may be connected (i.e., wirelessly or wired) to a central node. The central node may be a computer at the tower. The central node can actively manage every transponder 214 on multiple runways 200. In an exemplary embodiment, transponder 214 is configured to communicate to other transponders, the central node and/or act as a stand alone unit.

In FIG. 4B, airplane 10 is approaching runway 200. In an exemplary embodiment, runway lights 216 are positioned on both sides of runway 200. In this exemplary embodiment, transponder 214 is located inside and/or adjacent to runway lights 216. The signal strength of each transponder 214 can be reduced with the use of multiple transponders 214. In an exemplary embodiment, the overflow and/or interference may be minimized by utilizing multiple transponders 214. It should be noted that transponder 214 may transmit data, receive data or both.

In FIG. 4C, another illustration of a runway system is shown, according to an exemplary embodiment. In this exemplary embodiment, spillage of radio frequency activity to neighboring runways is controlled by filtering algorithms. In an exemplary embodiment, an airport includes runway$_{31}$ 222, runway$_{13}$ 226, runway$_{27}$ 224, and runway$_{09}$ 220. These runways have a transponder signal that includes a first signal envelope 228 and a second signal envelope 230. First signal envelope 228 and second signal envelope 230 are configured to minimize interference with other first signal envelopes and second signal envelopes.

Referring to FIGS. 2A, 2B, 4A, 4B and 4C, runway identification system 90 can function as a receiver and establishes communication with transponders 214 that are located on runway 200 at an airport. In an exemplary embodiment, this communication occurs when airplane 10 approaches within 1,000 feet proximity of runway 200. Transponders 214 are assigned to a specific runway 200. Transponders 214 contain unique and specific data regarding a specific runway 200. This data may be static or dynamic depending on the system configuration. This data may include runway ID number, runway length 202, runway end 204, wind 210 direction or wind 210 speed. In an exemplary embodiment, the data may also include end-of-runway warning, and condition of runway (i.e., hazard alerts, diversion runway).

In an exemplary embodiment, runway identification system 90 can be configured to receive signals from transponder 214. Runway identification system 90 can process and correct the signal utilizing filtering techniques. In an exemplary embodiment, transponders 214 are placed on runways 200 and are connected (i.e., wirelessly or wired) to a central node. Transponders 214 may be configured to communicate with each other via the central node. In an exemplary embodiment, runway identification system 90 can be configured to have full communication functionality with electronic flight bag 526 (see FIG. 6) in order to convey messages received from runway identification system 90. In an exemplary embodiment, notifications and alerts can be displayed at flight deck display 532 (see FIG. 6).

Each runway 200 can have information that is specific to that particular runway 200. In an exemplary embodiment, unidirectional transponders 214 can be used to ensure that transponders 214 on a particular runway 200 are not intercepting with transponders 214 on another runway 200. In an exemplary embodiment, each transponder 214 has the capability to be programmed with the necessary information by the appropriate users. In an exemplary embodiment, the appropriate users may be the control tower personnel, runway crew, computer support staff and/or operational personnel.

Figure 5:
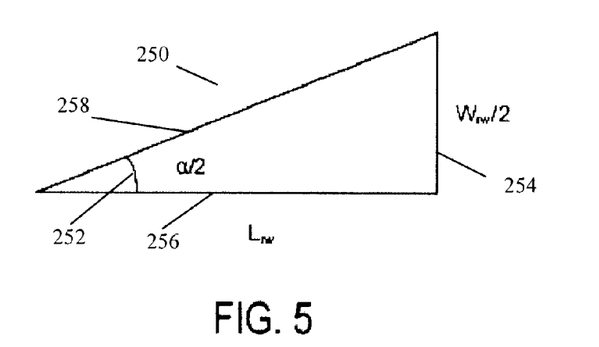
FIG. 5 is an illustration of a method of determining system parameters for the runway system of FIGS. 4A and 4C, according to an exemplary embodiment.

In FIG. 5, an illustration of a method of determining system parameters for the runway system of FIGS. 4A and 4C is shown, according to an exemplary embodiment. A right triangle 250 includes an α/2 angle 252, a $W_{rw}/2$ side 254, a $L_{rw}$ side 256 and a hypotenuse 258. In an exemplary embodiment, the formula to determine the beam width of transponder 214 is:

$$\alpha = 2\tan^{-1}((W_{rw}/2)/L_{rw}) \text{ and } D_{max} < L_{rw}$$

Where runway length 202 is $L_{rw}$, the width of runway 200 is $W_{rw}$, the maximum distance of taxing for lift is $D_{max} < L_{rw}$, the beam width of transponder 214 is α.

Figure 6:
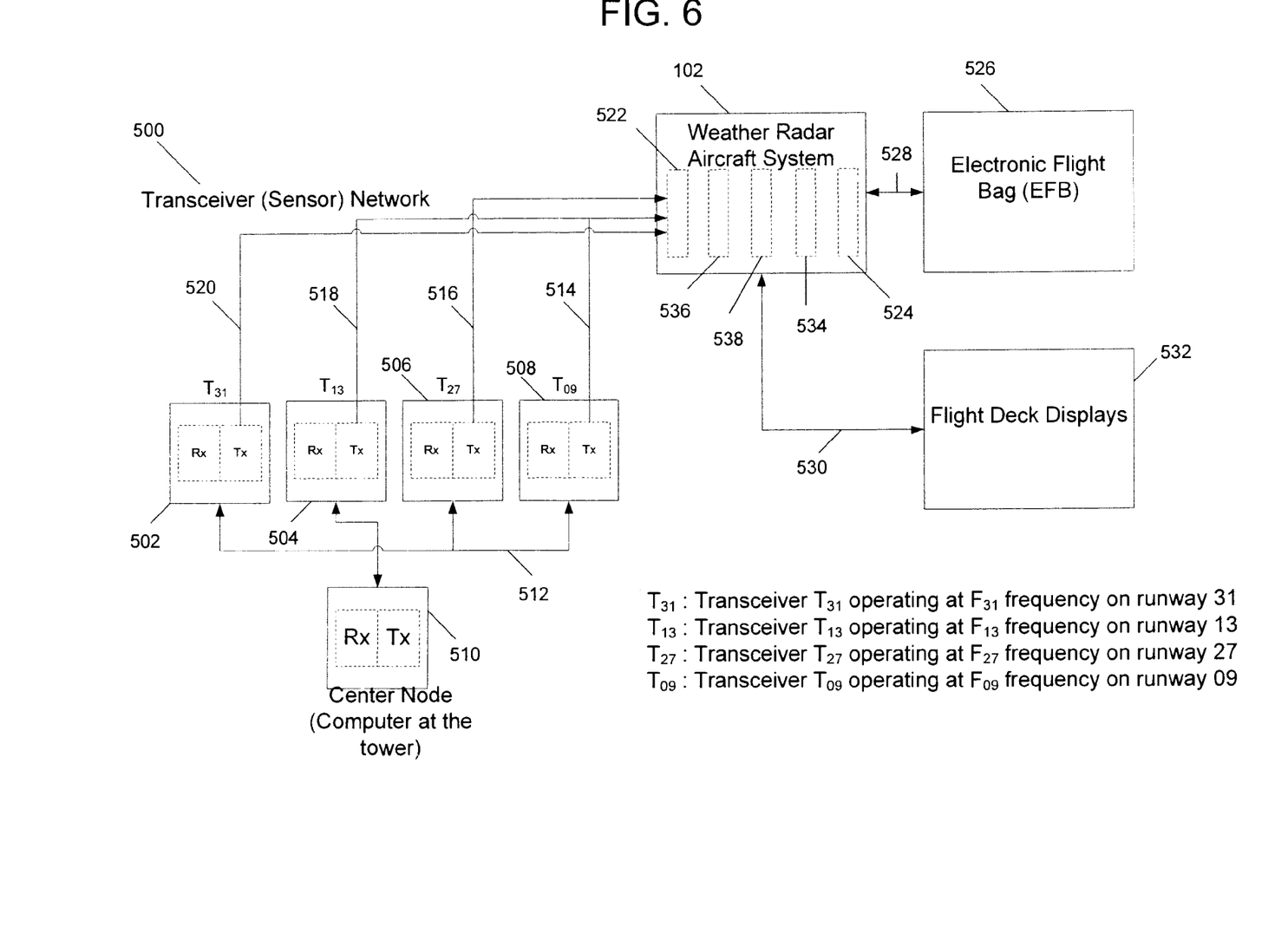
FIG. 6 is a block diagram of the system, according to an exemplary embodiment.

In FIG. 6, another block diagram of runway identification system 90 is shown, according to an exemplary embodiment. A transceiver network 500 includes a transceiver$_{31}$ 502, a transceiver$_{13}$ 504, a transceiver$_{27}$ 506, a transceiver$_{09}$ 508, and a center node 510. Transceiver network 500 is configured to communicate with weather radar 102 via a first communication path 514, a second communication path 516, a third communication path 518 and a fourth communication path 520. Weather radar 102 includes a receiver 522, a transmitter 524, a sensor 536, a processor 538 and a memory 534. In an exemplary embodiment, weather radar 102 communicates via a fifth communication path 528 to an electronic flight bag 526. In an exemplary embodiment, weather radar 102 communicates via a six communication path 530 to at least one flight deck display 532.

In an exemplary embodiment, transceiver$_{31}$ 502 operates at a $F_{31}$ frequency on runway$_{31}$, transceiver$_{13}$ 504 operates at a $F_{13}$ frequency on runway$_{13}$, transceiver$_{27}$ 506 operates at a $F_{27}$ frequency on runway$_{27}$ and transceiver$_{09}$ 508 operates at a $F_{09}$ frequency on runway$_{09}$. In an exemplary embodiment, airplane 10 is approaching runway$_{09}$ to potentially land on runway$_{09}$. In this exemplary embodiment, transceiver$_{09}$ 508 communicates runway$_{09}$ data to weather radar 102 via first communication path 514. In this exemplary embodiment, whether airplane 10 will land on runway$_{09}$ depends on the conditions present on runway$_{09}$. If transceiver$_{09}$ 508 does not issue a warning signal, airplane 10 may land on runway$_{09}$. If transceiver$_{09}$ 508 issues a caution and/or an advisory signal, airplane 10 may land on runway$_{09}$ depending on other communications with the control tower, other airplanes or aircraft crew experience.

In another exemplary embodiment, if transceiver$_{09}$ 508 issues a warning signal, the system may be configured to scan for the nearest runway 200 which is clear for landing and has the appropriate characteristics (i.e., length) for this particular airplane 10.

Figure 7:
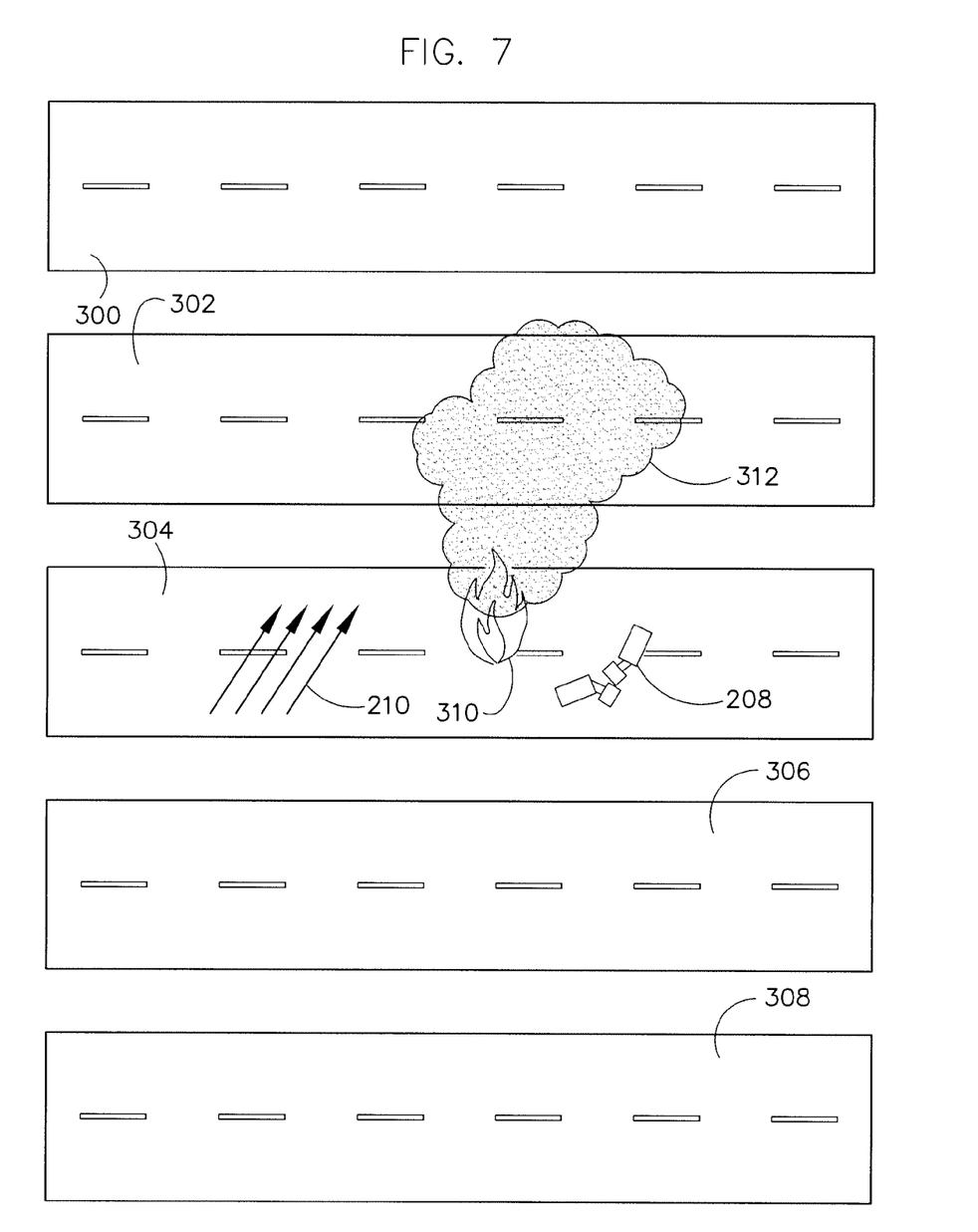
FIG. 7 is an illustration of a neighboring runway alert system, according to an exemplary embodiment.

In FIG. 7, an illustration of a neighboring runway alert system is shown, according to an exemplary embodiment. In an exemplary embodiment, an airport includes a first runway 300, a second runway 302, a third runway 304, a fourth runway 306, and a fifth runway 308. In this exemplary embodiment, third runway 304 may have various conditions that may be reported to any airplane 10 attempting to utilize third runway 304. These conditions may also be transmitted to airplanes 10 attempting to utilize first runway 300, second runway 302, fourth runway 306, and fifth runway 308.

In an exemplary embodiment, a fire 310 may be located on third runway 304. Fire 310 has produced a smoke cloud 312. In this exemplary embodiment, second runway 302 transponders may transmit a caution signal based on fire 310 and a warning signal based on smoke cloud 312. In an exemplary embodiment, runway identification system 90 can combine these signal into one warning signal. In this exemplary embodiment, first runway 300 transponders may transmit a caution signal based on smoke cloud 312. The caution signal could also be a warning signal depending on system parameter tolerances related to distance of hazard versus movement of hazard and/or significance of hazard.

In this exemplary embodiment, fourth runway 306 and fifth runway 308 transponders may transmit an advisory signal based on fire 310, smoke cloud 312 and wind 210 direction. This advisory signal may become a caution signal or a warning signal with a change in wind 210 direction.

In another exemplary embodiment, second runway 302 transponders may transmit an advisory signal, a caution signal or a warning signal based on wind 210 characteristics.

In another exemplary embodiment, fourth runway 306 transponders may transmit a caution signal and/or a warning signal based on the speed and/or distance of obstacle 208.

Figure 8:
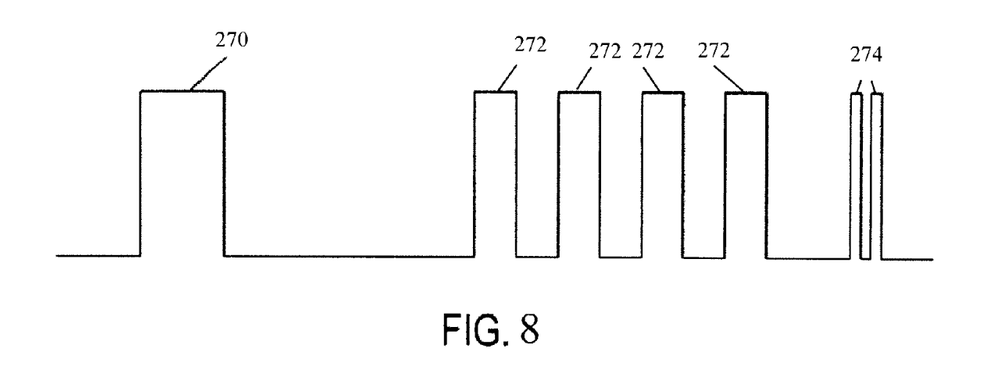
FIG. 8 is an illustration of the pulse width measurements in a weather mode, a windshear mode and a runway mode, according to an exemplary embodiment.

In FIG. 8, an illustration of the pulse width measurements in a weather mode, a windshear mode and a runway mode are shown, according to an exemplary embodiment. In an exemplary embodiment, transponder 214 transmits narrow and tall train pulses 274 in runway mode. Narrow and tall train pulses 274 provide the necessary information the aircrew needs regarding runway characteristics. In an exemplary embodiment, the pulse width may be 1 micro second. It should be noted that narrow and tall train pulse's 274 pulse width may vary from $10^{-9}$ micro second to 2 micro seconds. In an exemplary embodiment, pulse compression concepts are used to generate very high signal-to-noise ratio ("SNR") in order to ensure data quality. In an exemplary embodiment, pulse compression may be utilized to generate sharp and narrow pulses. In another exemplary embodiment, runway mode may use radio altitude to identify the height of airplane 10 from the ground, as opposed to the height of airplane 10 from sea level.

In an exemplary embodiment, wide and tall pulse pattern 270 may be used in weather mode. In an exemplary embodiment, wide and tall pulse pattern 270 may be 25 micro seconds. It should be noted that wide and tall pulse pattern 270 pulse width may vary from 5 micro seconds to 35 micro seconds. In another exemplary embodiment, medium and tall pulse pattern 272 may be used in windshear mode. In an exemplary embodiment, medium and tall pulse pattern 272 pulse width may vary from 0.5 micro second to 2.5 micro seconds.

In an exemplary embodiment, the weather mode may be initiated at or above 2,600 feet. The windshear mode may be initiated from 10 feet to 2,599 feet. Runway mode may be initiated below 2,600 feet.

In an exemplary embodiment, the receiver architecture of weather radar 102 is configured to allow weather radar receiver 522 to receive signal from transponder 214. Weather radar receiver 522 identifies utilizing filter technology these signals from transponder 214. In an exemplary embodiment, weather radar receiver 522 is a transceiver and a time delay is present between transmitting pulses. During this delay, weather radar receiver 522 is configured to listen to transponder 214. In another exemplary embodiment, runway identification system 90 can be configured to allow weather radar receiver 522 to receive signal from transponder 214.

Figure 9:
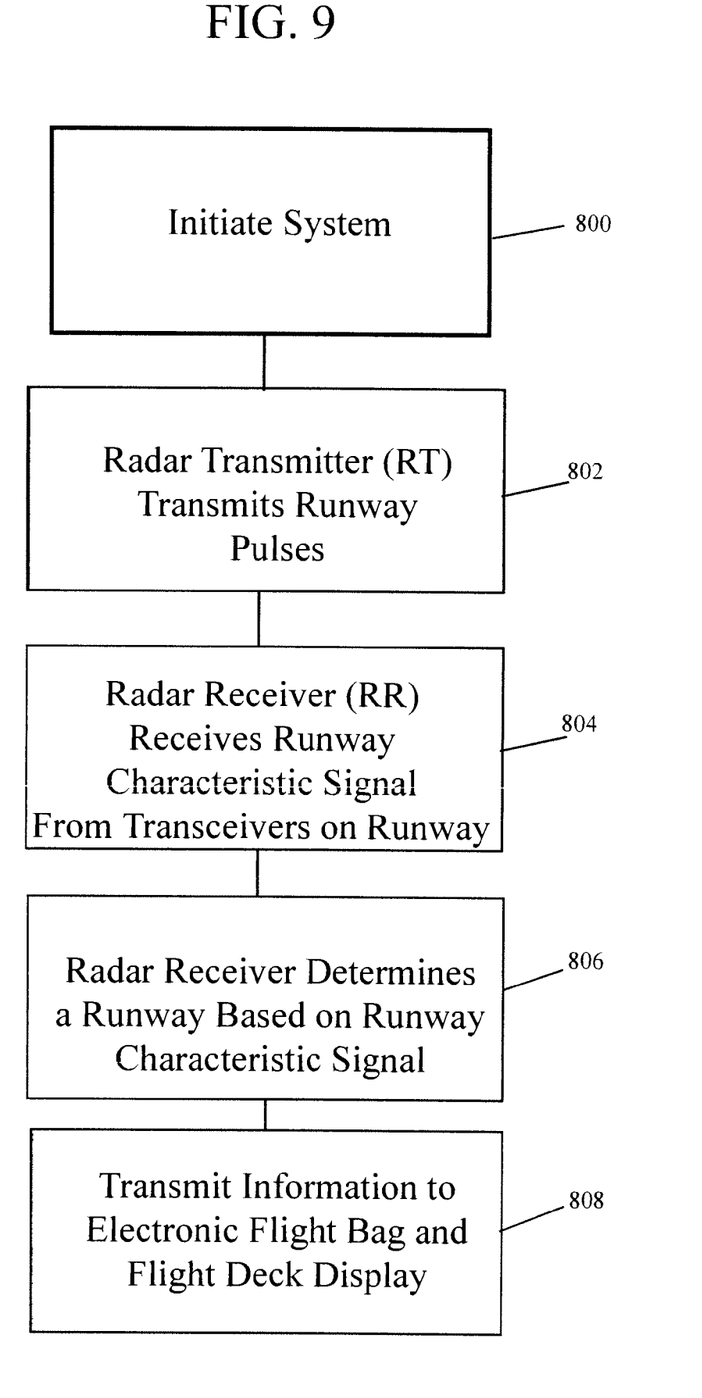
FIG. 9 is flowchart of a system operating procedure, according to an exemplary embodiment.

In FIG. 9, a process flowchart for the system is shown, according to an exemplary embodiment. Runway identification system 90 is initiated (step 800). The radar transmitter transmits runway pulses (step 802). Radar receiver receives runway characteristic signals from transceivers on runway 200 (step 804). Radar receiver determines runway 200 based on runway characteristic signal (step 806). Runway identification system 90 transmits information to electronic flight bag 526 and/or flight deck display 532 (step 808). In an exemplary embodiment, runway identification system 90 can be configured to store the runway signal in a database.

Figure 10A:
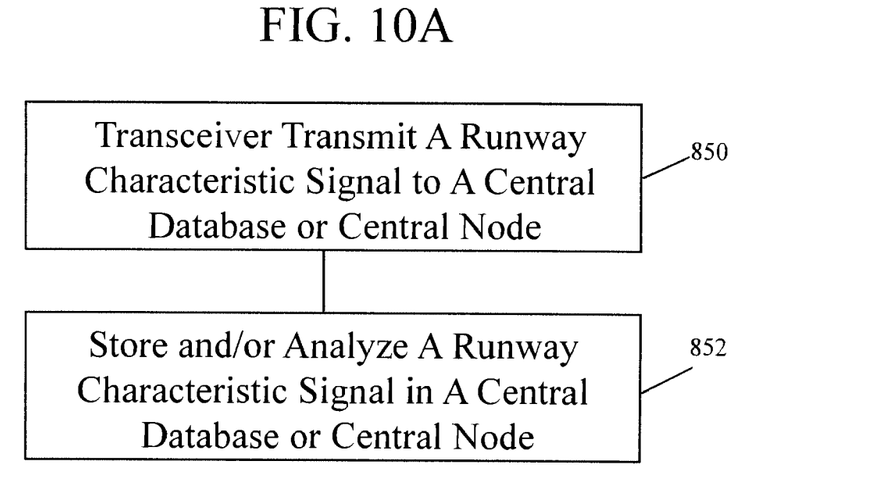
FIGS. 10A-10B are flowcharts of other system operating procedures, according to an exemplary embodiment.

In FIG. 10A, another process flowchart for runway identification system 90 is shown, according to an exemplary embodiment. Runway identification system 90 transmits a runway characteristics signal to a central database (step 850). The central database stores the runway characteristics signal (step 852).

Figure 10B:
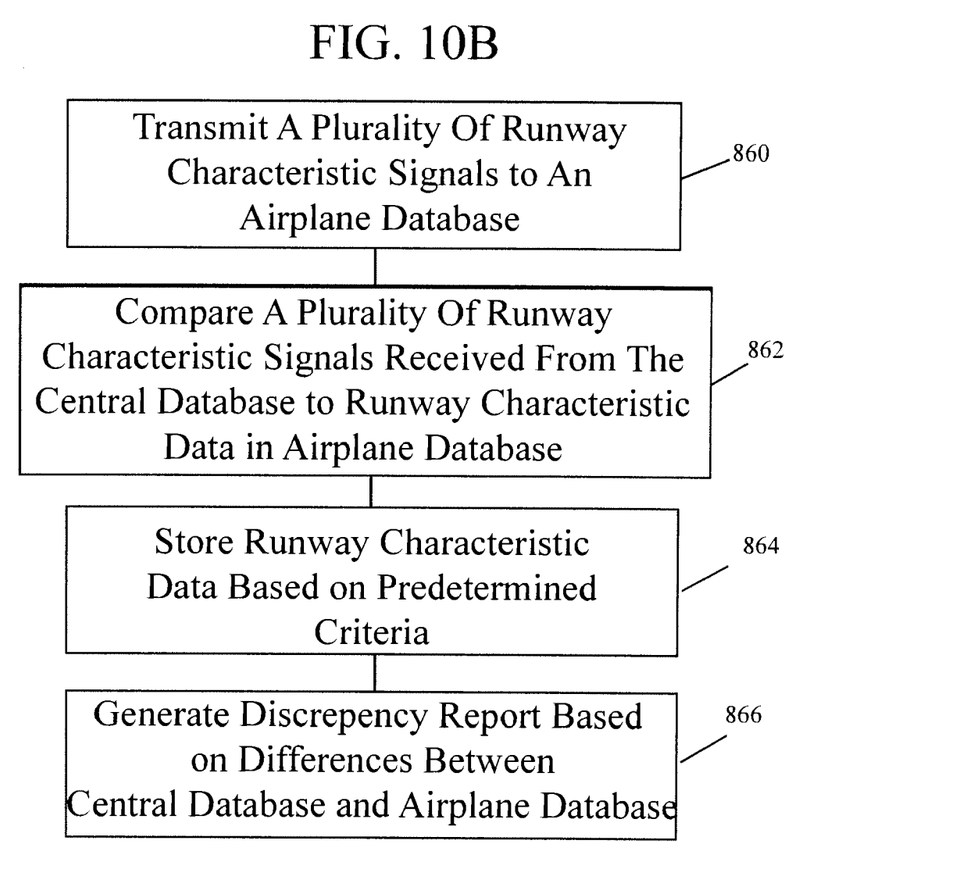

In FIG. 10B, another process flowchart for runway identification system 90 is shown, according to an exemplary embodiment. The central database transmits a plurality of runway characteristic signals to an airplane database (step 860). An airplane processor compares the plurality of runway characteristic signals received from the central database to runway characteristic data already stored in the airplane's database (step 862). The airplane processor stores the plurality of runway characteristic signals based on a predetermined set of criteria (step 864). In an exemplary embodiment, runway identification system 90 can analyzes discrepancies between the plurality of runway characteristic signals and the runway characteristic signals already stored in the airplane's database to determine which value should be stored in the airplane's database. In an exemplary embodiment, runway identification system 90 can be configured to generate a report of the discrepancies between the plurality of runway characteristic signals and the runway characteristic signals already stored in the airplane's database (step 866).

Although specific steps are shown and described in a specific order, it is understood that the method may include more, fewer, different, and/or a different ordering of the steps to perform the function described herein.

The exemplary embodiments illustrated in the figures and described herein are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system.

It is important to note that the construction and arrangement of the runway identification system 90 as shown in the various exemplary embodiments is illustrative only. Although only a few embodiments of the present application have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors and orientations) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application as defined in the appended claims. The order or sequence of any process or method steps may be varied or re-sequenced according to alternative embodiments. In the claims, any means-plus-function clause is intended to cover the structures described herein as performing the recited function and, not only structural equivalents, but also equivalent structures. Other substitutions, modifications, changes and omissions may be made in the design, operating conditions and arrangement of the exemplary embodiments without departing from the scope of the present application as expressed in the appended claims.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store a desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machine to perform a certain function or group of functions.

It should be noted that although the diagrams herein may show a specific order of method steps, it is understood that the order of these steps may differ from what is depicted. Also, two or more steps may be performed concurrently or with partial concurrence. Such variation will depend on the software and hardware systems chosen. It is understood that all such variations are within the scope of the application. Likewise, software implementations of the present application could be accomplished with standard programming techniques with rule-based logic and other logic to accomplish the various connection steps, processing steps, comparison steps and/or decision steps.

The foregoing description of embodiments of the application has been presented for purposes of illustration and description. It is not intended to be exhaustive or to limit the application to the precise form disclosed, and modifications and variations are possible in light of the above teachings, or may be acquired from practice of the application. The embodiments were chosen and described in order to explain the principles of the application and its practical application to enable one skilled in the art to utilize the application in various embodiments and with various modifications as are suited to the particular use contemplated.

Although the description contains many specificities, these specificities are utilized to illustrate some of the preferred embodiments of this application and should not be construed as limiting the scope of the application. The scope of this application should be determined by the claims, their legal equivalents, and the fact that it fully encompasses other embodiments which may become apparent to those skilled in the art.

What is claimed is:

1. A runway identification system, comprising:
   a weather radar system including a receiver, wherein the receiver is configured to receive a runway signal from a transponder associated with a runway, wherein the runway signal includes data, wherein the data is related to at least one of an atmospheric condition associated with the runway, an obstacle associated with the runway, a runway dimension, and an incident associated with the runway; and
   wherein an indication of an advisory, a caution or a warning is determined utilizing the runway signal.

2. The runway identification system of claim 1, wherein at least one of an advisory state, a caution state, and a warning state is determined based on the data associated with the runway signal.

3. The runway identification system of claim 1, wherein at least one of the runway signal and a runway identification signal is transmitted to an electronic flight bag.

4. The runway identification system of claim 1, wherein at least one of the runway signal and a runway identification signal is transmitted to a flight deck display.

5. The runway identification system of claim 1, wherein the runway signal includes data related to at least one of an obstacle and an occurrence.

6. The runway identification system of claim 1, wherein the runway signal is stored in a database.

7. The runway identification system of claim 6, wherein stored runway data is transmitted to an off-board central database.

8. The runway identification system of claim 7, wherein the off-board central database transmits a plurality of stored runway data to the database; and
   wherein the plurality of stored runway data was obtained from other runway identification systems.

9. The runway identification system of claim 7, wherein a processor compares the plurality of stored runway data to the received runway data and is configured to generate a discrepancy report.

10. A method for runway identification utilizing a runway transponder located in proximity to the runway, comprising:
- receiving a runway signal from the runway transponder, the runway signal having a frequency or data identifying a specific runway;
- determining a runway from the runway signal;
- transmitting a runway identification signal;
- determining at least one of an advisory state, a caution state, and a warning state in response to the runway signal; and
- storing the runway signal in a database.

11. The method of claim 10, wherein at least one of the runway identification signal, an advisory signal, a caution signal and a warning signal is transmitted to an electronic flight bag.

12. The method of claim 10, wherein at least one of the runway identification signal, an advisory signal, a caution signal and a warning signal is transmitted to a flight deck display.

13. The method of claim 10, further comprising transmitting the runway signal to a central database.

14. The method of claim 13, further comprising receiving a plurality of runway signals from a central database.

15. The method of claim 14, further comprising comparing the plurality of runway signals from the central database to runway signals in the database.

16. A runway identification system, comprising:
- a means for providing weather radar which includes a means for receiving a runway signal from a transponder associated with a runway, the runway signal having a frequency or data identifying a particular runway;
- a means for determining a runway identification utilizing the runway signal; and
- a means for transmitting at least one of an advisory signal, a caution signal, and a warning signal based on the runway signal.

17. The runway identification system of claim 16, wherein the means for providing weather radar transmits at least one of the runway signal, the advisory signal, the caution signal, and the warning signal to an electronic flight bag.

18. The runway identification system of claim 16, wherein the means for providing weather radar transmits at least one of the runway signal, the advisory signal, the caution signal, and the warning signal to a flight deck display.

19. The runway identification system of claim 16, wherein the runway signal includes data related to at least one of an obstacle and an occurrence.

20. A runway identification system for an airport, comprising:
- a first runway;
- a second runway;
- a first runway transponder;
- a second runway transponder;
- a communication network in communication with first runway transponder and second runway transponder; and
- wherein first runway transponder is configured to transmit a first runway characteristic signal corresponding to the first runway, the first runway signal having a frequency or data associated with the first runway; and
- wherein second runway transponder is configured to transmit a second runway signal corresponding to the second runway, the second runway signal having a frequency or data associated with the second runway, wherein the data includes at least one of wind data, runway length data, end of runway data and fire data.

21. The runway identification system for an airport of claim 20, wherein an airplane weather radar receives one of the first runway signal or the second runway signal.

22. The runway identification system for an airport of claim 20, wherein an emergency vehicle receives one of the first runway signal or the second runway signal.

* * * * *